(12) United States Patent
Chavez

(10) Patent No.: US 8,701,332 B1
(45) Date of Patent: Apr. 22, 2014

(54) COLLAPSIBLE DECOY

(76) Inventor: Miguel Chavez, Tularosa, NM (US)

(*) Notice: Subject to any disclaimer, the term of this patent is extended or adjusted under 35 U.S.C. 154(b) by 62 days.

(21) Appl. No.: 13/481,835

(22) Filed: May 27, 2012

Related U.S. Application Data

(60) Provisional application No. 61/508,545, filed on Jul. 15, 2011.

(51) Int. Cl.
*A01M 23/00* (2006.01)

(52) U.S. Cl.
USPC .................................................. 43/2

(58) Field of Classification Search
USPC .................................................. 43/2
See application file for complete search history.

(56) References Cited

U.S. PATENT DOCUMENTS

| | | | | |
|---|---|---|---|---|
| 4,590,699 A * | 5/1986 | Nicks | ................................... | 43/2 |
| 4,817,579 A * | 4/1989 | Mathias | ....................... | 124/23.1 |
| 5,235,772 A * | 8/1993 | Mendick, Jr. | ........................ | 43/1 |
| 5,522,168 A * | 6/1996 | Friddle | ............................... | 43/1 |
| 5,546,692 A * | 8/1996 | Byers | ................................... | 43/2 |
| 5,943,807 A * | 8/1999 | McPherson | ......................... | 43/2 |
| 6,296,005 B1 * | 10/2001 | Williams et al. | ................. | 135/98 |
| 6,925,745 B1 * | 8/2005 | Alessi | ................................... | 43/1 |
| 7,594,515 B2 * | 9/2009 | Prock | ............................. | 135/117 |
| 7,828,003 B2 * | 11/2010 | Montecucco | .................... | 135/98 |
| 8,087,199 B2 * | 1/2012 | Roe | ..................................... | 43/2 |
| 2012/0272428 A1 * | 11/2012 | Renner | ................................ | 2/69 |

* cited by examiner

Primary Examiner — Christopher P Ellis
(74) Attorney, Agent, or Firm — Plager Schack, LLP

(57) ABSTRACT

A lightweight decoy comprises a fabric sheet having a front portion with a digital image and a rear portion and is provided rigidity by a flat flexible perimeter band fastened generally to the perimeter of the fabric sheet. The perimeter band is capable of twisting and folding onto itself such that the decoy is collapsible into a reduced size for transport. By means of a plurality of straps, the decoy may be attached to a support such as a bow or tripod. A central opening through the fabric sheet is capable of receiving a firearm barrel, an arrow or a camera lens.

9 Claims, 3 Drawing Sheets

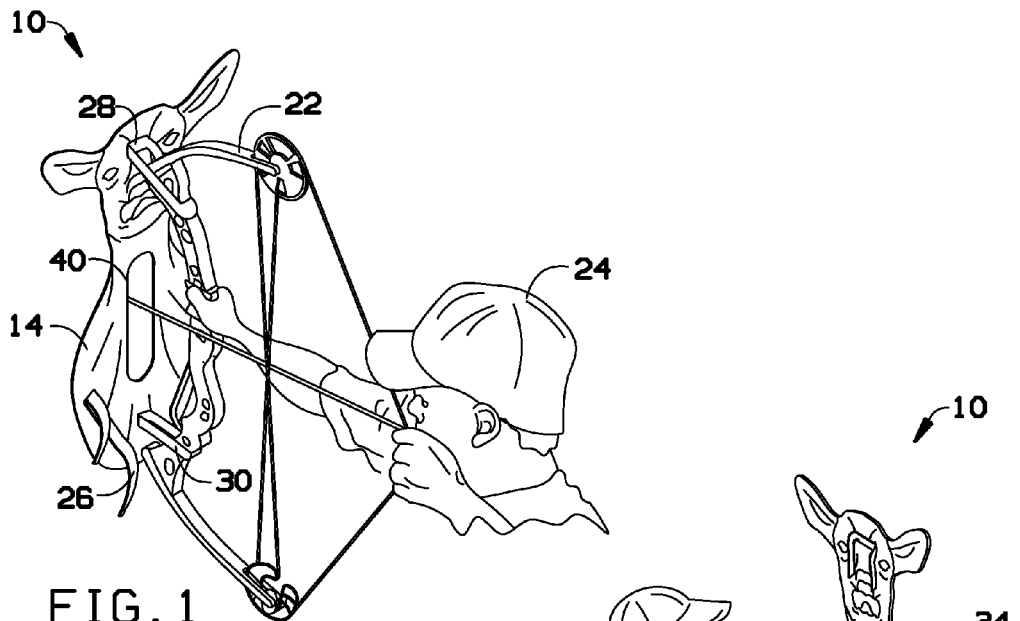
FIG. 1
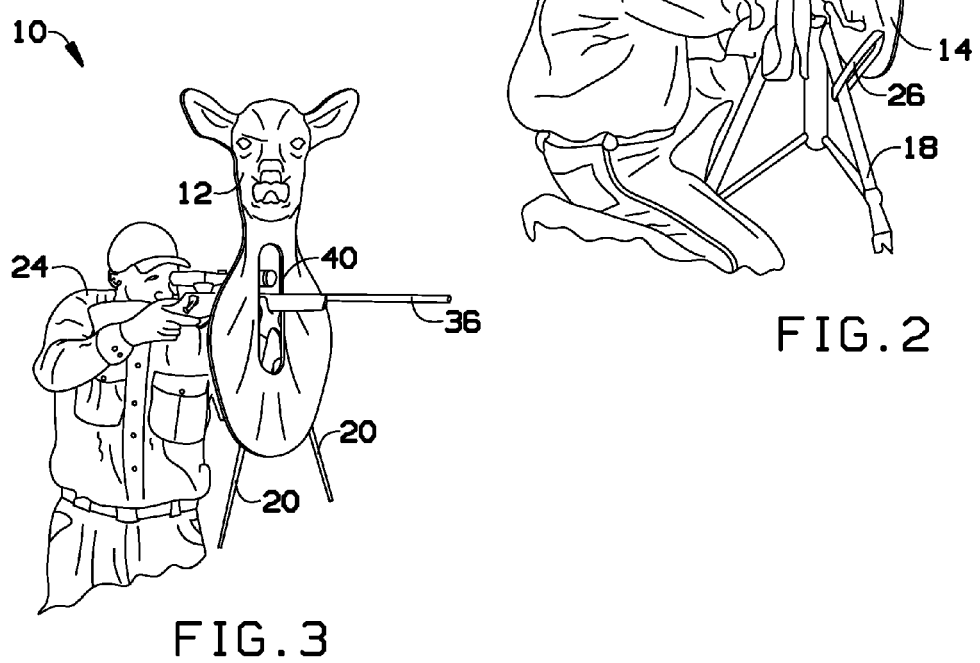
FIG. 2
FIG. 3

COLLAPSIBLE DECOY

CROSS REFERENCE TO RELATED APPLICATIONS

This application claims the priority benefit of U.S. Provisional Application No. 61/508,545 filed on Jul. 15, 2011 which is incorporated herein by reference in its entirety.

BACKGROUND OF THE INVENTION

The present invention relates to the field of outdoor recreation and nature viewing and, in particular, relates to decoys.

Decoys are a known means of attracting animals and keeping them calm and, in some cases, decoys allow outdoor enthusiasts to avoid the notice of animals to make closer observations.

Current decoy devices and systems are large and cumbersome. Because of this, it is difficult for an outdoor enthusiast to move into different positions and orientations while remaining fully obscured from view behind the decoy. Additionally, the size of decoys prevent them from being stowed in a small space and carried. The current decoy devices do not attach to the weapon of choice or shooting aids to help steady a firearm or camera. The common materials of construction, plastic or rubber, are not easily folded, compressed or collapsed.

SUMMARY OF THE INVENTION

A decoy, in accordance with preferred embodiments of the present invention, is lightweight and collapsible to allow for easy transport and motion while in use. The user can move it in any direction at all time cause not knowing which direction the game animal will come from. With the present invention, a user can cover his or her outline to escape notice of a nearby animal. The present invention also will attach to a bow, crossbow, shooting steady aids for any firearm and camera steady aids for capturing images or viewing.

According to one embodiment of the present invention, a decoy comprises a fabric sheet having a front portion with a digital image and a rear portion; a flat flexible perimeter band fastened end to end generally supporting the perimeter of the front and rear portion of the fabric sheet. The perimeter band is capable of twisting and folding onto itself such that the decoy is collapsible into a reduced size for transport; a decoy support; a plurality of straps having middle portions attached to the rear portion of the fabric sheet; and a central opening through the fabric sheet capable of receiving a firearm barrel.

BRIEF DESCRIPTION OF THE DRAWINGS

FIG. 1 illustrates a perspective view of an exemplary embodiment of the present invention in use with a hunting bow.

FIG. 2 illustrates another perspective view of an exemplary embodiment of the present invention in use with a camera.

FIG. 3 illustrates another perspective view of an exemplary embodiment of the present invention in use with a firearm.

DETAILED DESCRIPTION OF THE INVENTION

Figure 4:
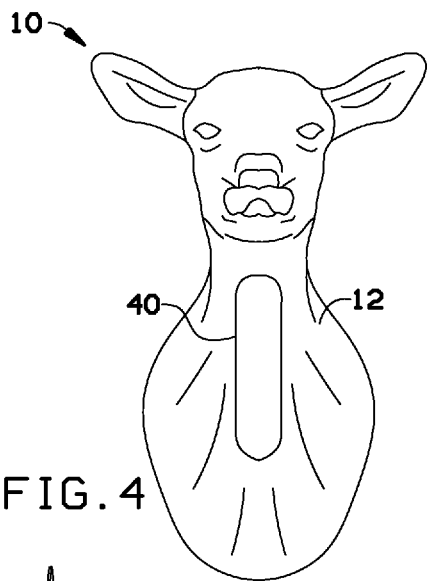
FIG. 4 illustrates a front view of an exemplary embodiment of the present invention.

FIG. 1 illustrates a perspective view of an exemplary embodiment of the present invention in use with a hunting bow. As shown, a user may attach an exemplary hunting bow 22 to a decoy 10 in accordance with the present invention by wrapping straps 28 and 30 around a portion of the bow arms and fastening ends of the straps 28 and 30 together to hold the decoy 10 to the bow 22. With bow 22 attached to decoy 10, an arrow may be placed through opening 40 and notched to a bow string for firing of the arrow through opening 40. Fabric sheets 12 and 14 may be of a generally ovular form and include a digital image of portions of an animal which may include the chest, neck, the face and ears. In some embodiments, a quick connect mechanism is provided near an area of decoy 10 close to the bow stabilizer area.

FIG. 2 illustrates another perspective view of an exemplary embodiment of the present invention in use with a camera. As shown, a user may attach decoy 10 to a tripod 18 by wrapping straps 26 around the legs of the tripod and fastening the ends of straps 26 together to hold decoy 10 to tripod 18. A camera lens may then be positioned through opening 40 to allow a photographer to be obscured behind decoy 10 while photographing.

FIG. 3 illustrates another perspective view of an exemplary embodiment of the present invention in use with a firearm. Firearm 36 may be supported by shooting sticks or bipod 20 with the barrel of firearm 36 protruding through opening 40.

FIG. 4 illustrates a front view of an exemplary embodiment of the present invention. Decoy 10 is preferably provided with an image of an animal on its front portion, which may be the frontal view of a particular type of animal, but not limited (e.g. deer, elk, moose, antelope, turkey, coyote, cow, etc.).

Figure 5:
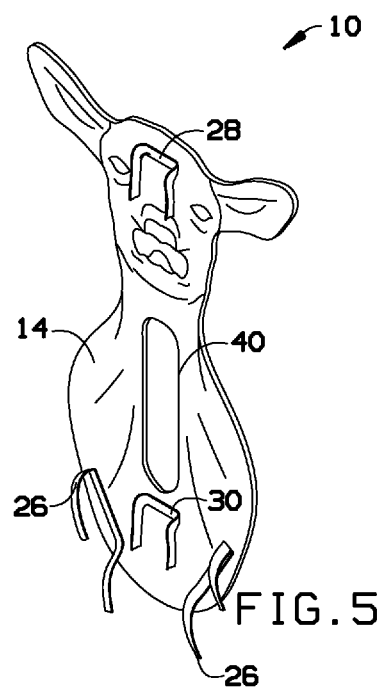
FIG. 5 illustrates a rear perspective view of an exemplary embodiment of the present invention.

FIG. 5 illustrates a rear perspective view of an exemplary embodiment of the present invention, which may or may not have an image on the rear portion. Straps 26, 28 and 30 are provided on a rear sheet 14. Straps 28 and 30 are suitable for gripping the riser or limbs of a bow as illustrated in FIG. 1. Opening 40 provides for insertion of an arrow, firearm barrel, camera lens or other object through the fabric sheet image 12/14.

Figure 6:
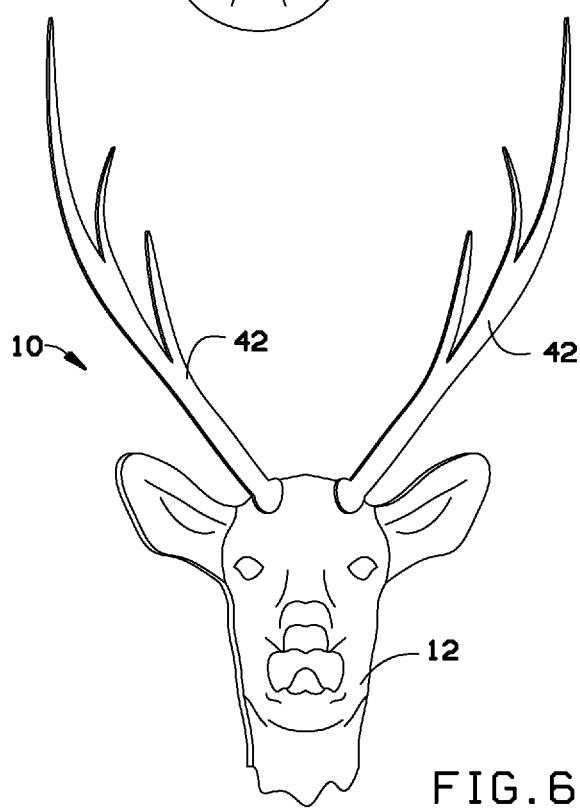
FIG. 6 illustrates a front perspective view of another exemplary embodiment of the present invention, with optional attachable/detachable antler/horns 42.

FIG. 6 illustrates a front perspective view of another exemplary embodiment of the present invention. Detachable antlers 42 may be temporarily fastened to front portion 12 of the fabric sheet. In some embodiments, this fastening is accomplished by use of hook-and-loop fasteners, such as those manufactured by Velcro, if needing to use a male decoy.

Figure 7:
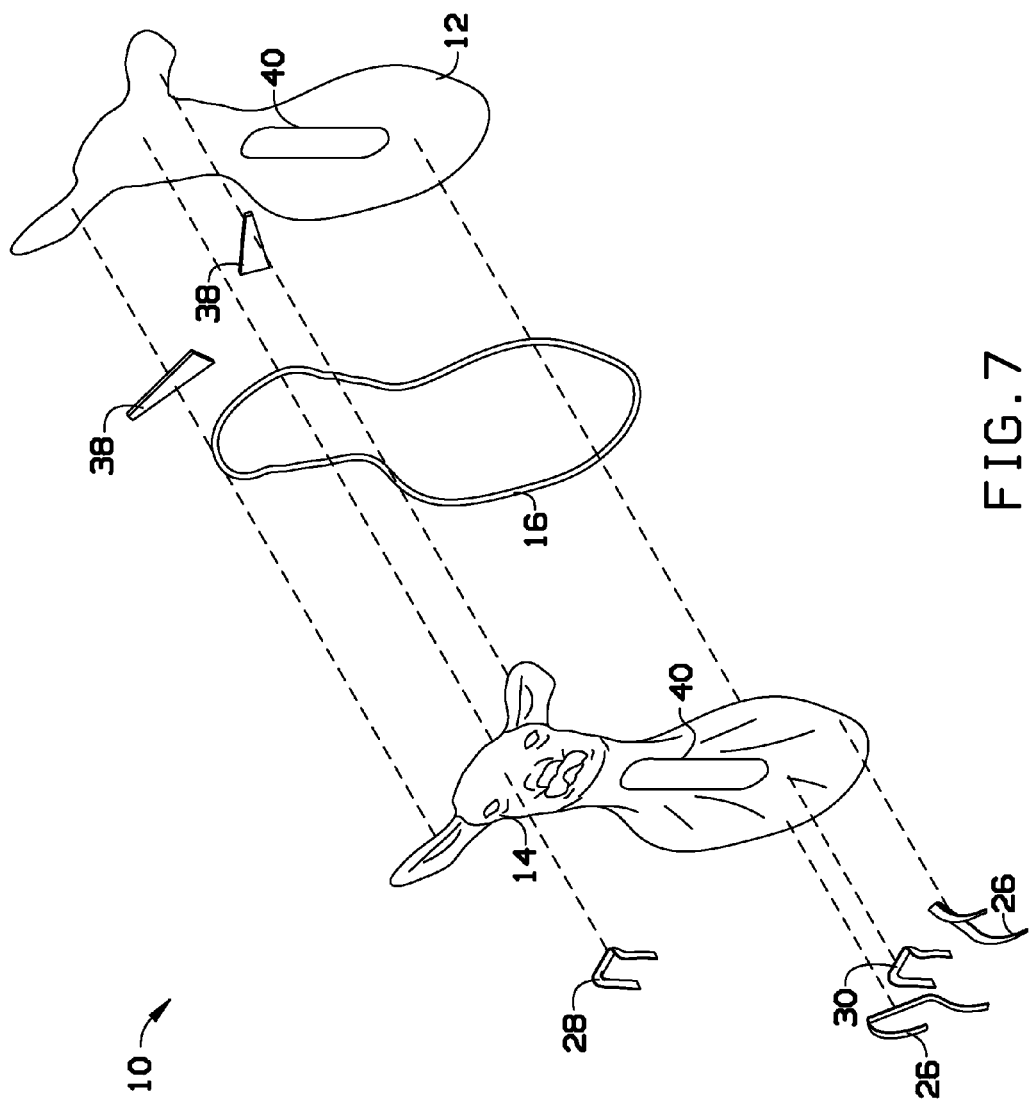
FIG. 7 illustrates an exploded view of the embodiment of FIGS. 1-5.

FIG. 7 illustrates an exploded view of the embodiment of FIGS. 1-5. Flattened spring band 16 is fastened to the perimeter of fabric sheets 12/14 to provide rigidity to decoy 10. This fastening may be accomplished by, for example, the flattened spring band looping and attached end to end 16 to form an ovular shape and inserted between the sewn perimeter of the front 12 and rear 14 fabric sheets. Plastic ear-stiffening inserts 38 may be provided, for example by sewing, at a top portion of decoy 10 to support any ears of the image 12 in an upright position.

Band 16 is flexible, attachable end-to-end and causes a collapsing and folding of decoy 10 upon itself when of a top portion of decoy 10 is twisted relative to a bottom portion of decoy 10. In this way, decoy 10 may be easily stored, for example, in a pocket or small carrying case made for the decoy.

While the digital image of the present invention has been depicted as being a frontal view of an animal, one or more of a variety of views may be provided including an image in which the head of the animal is turned to one side or is in partial side view. Various types of animals may be depicted including but not limited to moose, antelope, deer, elk, turkey, coyote, and domestic cow. In an alternative embodiment, the fabric sheet may be a digital screen programmable to display images of different animal.

In operation, the decoy 10, in a collapsed and folded configuration, may be withdrawn from a small pouch or pocket when an animal is nearby. Upon release of decoy 10 from any binding forces, decoy 10 will expand into its flattened configuration as depicted in FIGS. 1-7. With decoy 10 in an expanded state, a bow may be attached using magnets or straps as viewed in FIG. 1, a tripod may be attached using straps 26 such that decoy 10 may be used with a camera as viewed in FIG. 2, or shooting sticks 20 such that decoy 10 may be used with a firearm as depicted in FIG. 3

As shown in FIGS. 1-3, decoy 10 is attachable to a variety of support devices including but not limited to mono-pods, bi-pods, or tri-pods.

In some embodiments, ends of straps 26, 28 and 30 are securable together by use of a hook-and-loop fastener such as Velcro. In other embodiments, buckles, plastic loops, clasps or snaps are preferred.

In some embodiments, a plurality of magnets, not shown, may be sewn into the fabric sheet of decoy 10. These magnets may be provided in a generally vertical orientation near the vertical centerline of decoy 10 and allow for a quicker attachment of decoy 10 to a bow in a manner similar to that shown in FIG. 1.

In some embodiments, decoy 10 may be provided with an extra portion of fabric in the form of a flap which may accommodate attachment of a scent device.

Optional safety hunter orange flagging straps maybe attached anywhere to the front portion 14 by use of hook-and-loop fasteners, such as those manufactured by Velcro or safety pins, to identify the decoy as a hunter or viewer behind it.

A camouflaged pocket, not pictured, may be provided to allow for carrying of decoy 10 in a collapsed state.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A decoy, comprising:
a fabric sheet having a front portion with an image of an animal and a rear portion;
a flat flexible perimeter band fastened generally to an outer perimeter of the rear portion of the fabric sheet, said perimeter band being capable of twisting and folding onto itself such that the decoy is collapsible into a reduced size for transport while also expanding to hold the fabric sheet in a rigid position when in use;
a decoy support;
a first strap having a middle portion attached near a top portion of the rear portion of the fabric sheet and having a hook portion of a hook-and-loop fastener at a first end and a loop portion of a hook-and-loop fastener at a second end;
a second strap having a middle portion attached near a bottom portion of the rear portion of the fabric sheet and having a hook portion of a hook-and-loop fastener at a first end and a loop portion of a hook-and-loop fastener at a second end;
a third strap having a middle portion attached near a lower, right edge of the rear portion of the fabric sheet and having a hook portion of a hook-and-loop fastener at a first end and a loop portion of a hook-and-loop fastener at a second end, said third strap being attachable to said decoy support;
a fourth strap having a middle portion attached near a lower, left edge of the rear portion of the fabric sheet and having a hook portion of a hook-and-loop fastener at a first end and a loop portion of a hook-and-loop fastener at a second end, said fourth strap being attachable to said decoy support;
a central opening through the fabric sheet capable of receiving a firearm barrel;
a plurality of stiffening members fastened near said top portion of the rear portion of the fabric sheet;
a plurality of stiff bands attached to said rear portion of the flexible fabric sheet to provide additional stability and rigidity to the decoy; and
a plurality of artificial bony appendage attachments connectable to an upper portion of said front portion of said fabric sheet.

2. A decoy, comprising:
a fabric sheet having a front portion with an image and a rear portion;
a flat flexible perimeter band fastened generally to an outer perimeter of the rear portion of the fabric sheet, said perimeter band being capable of twisting and folding onto itself such that the decoy is collapsible into a reduced size for transport while also expanding to hold the fabric sheet in a rigid position when in use;
a decoy support;
one or more attachment mechanisms fastened to the rear portion of the fabric sheet for attaching the decoy to an object; and
a central opening through the fabric sheet capable of receiving a firearm barrel.

3. The decoy of claim 2, wherein:
the decoy support is in the form of a tripod.

4. The decoy of claim 2, wherein:
said plurality of straps comprise:
a first strap having a middle portion attached near a top portion of the rear portion of the fabric sheet and having fasteners at first and second ends;
a second strap having a middle portion attached near a bottom portion of the rear portion of the fabric sheet and having fasteners at first and second ends;
a third strap having a middle portion attached near a lower, right edge of the rear portion of the fabric sheet and having fasteners at first and second ends, said third strap being attachable to said decoy support; and
a fourth strap having a middle portion attached near a lower, left edge of the rear portion of the fabric sheet and having fasteners at first and second ends, said fourth strap being attachable to said decoy support.

5. The decoy of claim 4, wherein:
said fasteners of said first second, third and fourth straps comprise hook portions and loop portions of hook-and-loop fasteners.

6. The decoy of claim 2, further comprising:
a plurality of artificial bony appendage attachments connectable to an upper portion of said front portion of said fabric sheet.

7. The decoy of claim 2, wherein:
said image is in the form of an animal.
8. The decoy of claim 2, further comprising:
a plurality of stiffening members fastened near said top portion of the rear portion of the fabric sheet.
9. The decoy of claim 4, wherein:
said first and second straps are capable of wrapping around limbs of a bow to secure the bow to the rear portion of the flexible fabric sheet.

\* \* \* \* \*